J. B. Smith.

Nut and Bolt Fastening.

Nº 87,717.    Patented Mar. 9, 1869.

Witnesses,

Inventor.

J. B. SMITH, OF MILWAUKEE, WISCONSIN, ASSIGNOR TO HIMSELF AND GEORGE R. CHITTENDEN, OF CHICAGO, ILLINOIS.

Letters Patent No. 87,717, dated March 9, 1869.

IMPROVEMENT IN SCREW-BOLTS AND LOCK-NUTS.

The Schedule referred to in these Letters Patent and making part of the same.

*To all whom it may concern:*

Be it known that I, J. B. SMITH, of the city of Milwaukee, and State of Wisconsin, have invented a new and useful Improvement in Screw-Bolts and Nuts; and I do hereby declare that the following is a full, clear, and exact description thereof, which will enable those skilled in the art to make and use the same, reference being had to the accompanying drawing, forming part of this specification, in which—

Figure 1:
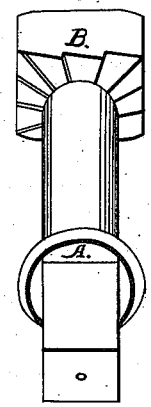
Figure 2:
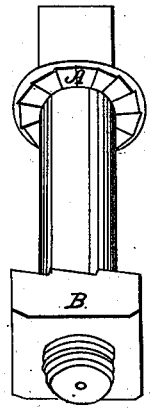

Figure 1 is a view of the bolt and nut, the faced side of the nut toward you, and Figure 2, a view of the bolt and nut, the face side of the head toward you.

Similar letters of reference in each of the figures indicate corrresponding parts.

The object of my invention is to produce a bolt and nut that will not work loose, but will remain locked, no matter how much jar there may be.

It is ofttimes the case that the nut will remain firm, yet the bolt will jar and turn, and thus the bolt and nut both become loose. In other cases the bolt will turn, when it is round, and there is no chance to hold it when screwing up the nut. In both these cases, my improvement, of corrugating or serrating the head of the bolt, obviates this difficulty, for the moment the nut draws on the bolt, the serrations or corrugations take hold of the bearing, and prevent the bolt from turning, and when it is screwed up solid, neither the bolt nor the nut can turn. without shaving off some of the surface, either under the head of the bolt or under the nut.

A is the bolt, with the under side of the head corrugated or serrated, so that when the nut is set up it will hold without turning.

B, the nut, serrated on the face, so that it will move up easily, but will not unscrew without taking a shaving off the material that it is screwed on to.

I sometimes make the bolt and nut of steel, and harden them. I sometimes make them of iron, and case-harden them. When to be used on wood-work, I make them of iron, without hardening.

Operation.

Put the bolt in the place designed for use, and screw down the nut, and it will remain in place without unscrewing.

What I claim as my invention, and desire to secure by Letters Patent, is—

1. A bolt, with a corrugated or serrated head, in combination with a nut, serrated on the faced side, substantially as described.

2. A bolt, with a serrated or corrugated head, so that it will not turn when the nut is screwed on to it, substantially as described.

J. B. SMITH.

Witnesses:
H. S. LOOK,
CHAS. A. SMITH.